Figures 1, 2:
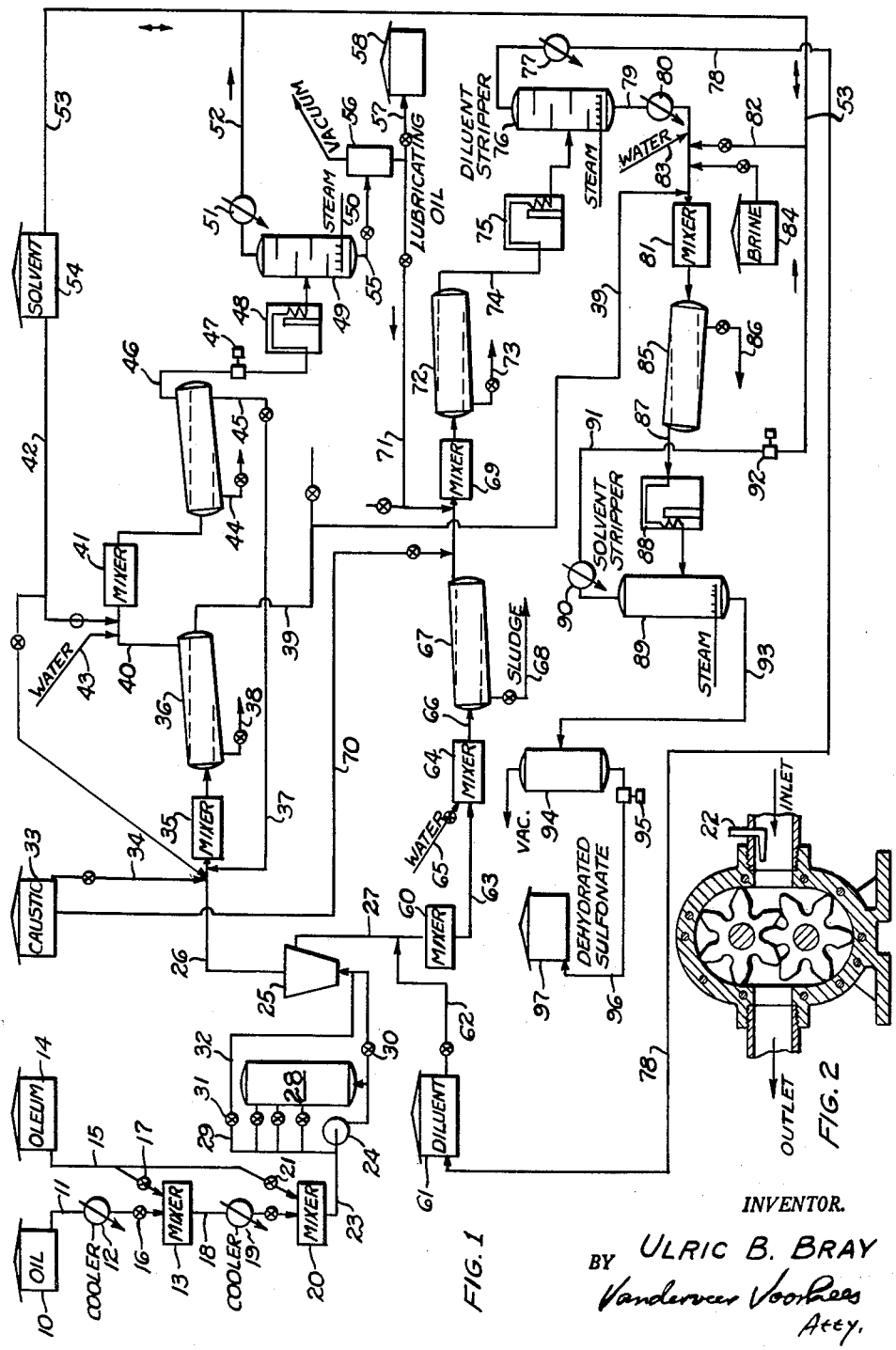

May 8, 1962     U. B. BRAY     3,033,898

SULFONATION OF OILS

Filed Aug. 18, 1958

INVENTOR.

BY ULRIC B. BRAY

Vandervoer Voorhees
Atty.

United States Patent Office 3,033,898
Patented May 8, 1962

3,033,898
SULFONATION OF OILS
Ulric B. Bray, Pasadena, Calif., assignor to Bray Oil Co., Los Angeles, Calif., a limited partnership of California
Filed Aug. 18, 1958, Ser. No. 755,559
9 Claims. (Cl. 260—504)

This invention relates to a process of making sulfonates and particularly the preferentially oil soluble sulfonates known as mahogany sulfonates having molecular weights in the range of 400 to 900, generally about 450 to 600. More particularly, it relates to the manufacture of such sulfonates by the sulfonation of lubricating oils from petroleum by the action of fuming sulfuric acid (oleum) or sulfur trioxide.

The invention is illustrated by a drawing which shows, in FIGURE 1, a schematic flow diagram of the process and in FIGURE 2, a mixing device suitable for use therein.

Sulfonates of the type described above are of great value in industry for making rust preventive and preservative oils, for detergents in lubricating oils, particularly crank case oils used in internal combustion engines, for control of surface tension, wetting and penetrating action of oils, as dispersants in fuel oils and for many other uses. They are usually employed as sulfonates of sodium, ammonium, calcium or barium, altho numerous other metals can be used in their composition, such as potassium, lithium, magnesium, iron, aluminum, lead, copper and zinc. Amine sulfonates are also important, such as those made with morpholine, ethylene diamine and dibutylamine. The mahogany sulfonates of the polyvalent metals are water insoluble and are preferred for antirust oils and lubricating oil compositions. They can be made in a basic form in which the metal is present in an amount exceeding the stoichiometric ratio.

Heretofore, in the manufacture of sulfonates from lubricating oils, it has generally been the practice to mix intimately the oil and oleum and settle the product to remove a sludge layer which is withdrawn from the bottom of the settling tank after several hours. Owing to the relatively high viscosity of the oil, which must be kept below about 125° F. to avoid decomposition of sulfonic acids which are temperature sensitive, the removal of sludge has long been a serious problem. One method of attacking the problem has involved diluting the sulfonated oil with a hydrocarbon solvent, generally a naphtha, to speed settling of sludge and promote the transfer of the desired sulfonic acids from the sludge into the oil phase. However, if an aromatic naphtha such as toluene or xylene is used, it is necessary to first add water to prevent sulfonation of the naphtha and formation of undesirable water soluble sulfonates. This method is described in my U.S. Patent 2,732,344. When paraffinic naphtha resistant to sulfonation was used, it was found that the yield of sulfonate was seriously diminished, owing to the low solubility of the sulfonic acids in paraffinic hydrocarbons. One of the chief disadvantages resulting from the use of water to facilitate the separation of sludge from the sulfonated oil is the dark color imparted to the sulfonate product and to the by-product lubricating oil. In addition to the dark red color of the lubricating oil, there is also introduced into the oil, undesirable carbon-forming resins released from the sludge by the water, considerably reducing its value as a motor oil.

My invention is not concerned, however, with the manufacture of lubricating oils by treatment of raw stocks containing unstable, sludgy hydrocarbons with sulfuric acid—usually 93–98%. The acid treatment of such oils is long established in petroleum refining. The waste acid sludge resulting from it is a black tar containing little or no desirable sulfonic acids of the oil soluble type.

In the sulfonation process, using oleum having dissolved $SO_3$, the actual concentration of the "spent" acid cannot be determined easily because the high concentration of the acid gives compounds with hydrocarbon materials and sulfonates which cannot be separated except by dilution. I have devised an indirect method of analysis of the acid phase according to which the hydrocarbons are first liberated with water, separately weighed and their weights subtracted from the sample used for acid determination. Following is a description of this procedure:

ANALYSIS OF ACID PHASE

To a 25 gram sample of acid phase, add 100 cc. water and 50 cc. of benzene. Heat the mixture to boiling and add 20 cc. of a 15% NaCl solution to break the emulsion. Transfer to a separating funnel and let stand 20 minutes to separate. Draw the bottom layer into a 250 cc. volumetric flask, adjust volume with water and titrate the sulfuric acid against standard KOH with phenolphthalein indicator. Evaporate the benzene from the hydrocarbon sulfonate layer, heating in an air stream until incipient decomposition as shown by odor of $SO_2$ and weight the residue.

Calculation:

$$\text{Percent } H_2SO_4 = \frac{\text{cc. NKOH} \times .049}{25 - \text{wt. of residue}} \times 100$$

Using this method, the concentration of acid in the acid phase from treatment of 480 viscosity solvent treated neutral oil (85 V.I.) with 10 vol. percent of oleum—26% $SO_3$—was 98.5%. Another acid phase from sulfonation tested 93.1% $H_2SO_4$. These high concentrations of "spent" acid illustrate the difference between sulfonation of refined oils and simple acid refining of raw oils for color.

I have now discovered that when a hydrocarbon lubricating oil stock is used which is already "pre-refined" with sulfuric acid and/or selective solvents and when oleum is employed as the sulfonating agent with $SO_3$ concentrations from 15 to 25% and up to 65%, the acid remaining in the sludge is no longer a weak acid around 50–80%, but has a concentration over 90% up to 100%. In such a "spent" acid, I have discovered that a major part of the desired sulfonic acids are soluble while only a minor part remains in the oil. Heretofore, when sulfonating such oils, hydrocarbon or chlorinated hydrocarbon solvents have been used to transfer the sulfonic acids from the acid phase to the oil phase, or water has been added to release the sulfonic acids or the sulfonation product has been allowed to stand for many hours during which time oxidation reactions proceeded with the formation of $SO_2$ and $H_2O$, thus liberating the mahogany acids from the acid phase. All such methods have been objectionable for one reason or another, but principally because they resulted in products of poor color and a lubricating oil with bad carbonization properties. Long contact time between the sulfonic acids and the "spent" acid has resulted in oversulfonation with formation of more undesirable "green" acids. Dilution with water has transferred color bodies and resins to the lubricating oil from which they can be removed only with great difficulty.

Because the acid phase from oleum sulfonations of refined lubricating stocks usually separates into a thin, lower layer and a thick upper layer on standing, many operators have included in the upper lubricating oil phase, a considerable amount of the thick sludge which is rich in sulfonic acids, thus confusing these acids with the truly oil soluble acids.

I have now discovered that, while the amount of truly preferentially oil soluble sulfonic acids produced in the reaction between pre-refined lubricating oils extracted with solvents (e.g.: furfural, phenols, etc.) and oleum may be quite large—as much as 25% of the stock with some oils—(1) only a minor portion of these preferred sulfonic acids is found in true solution in the oil phase of the reaction mass of oleum and oil, and (2) the major portion of these sulfonic acids (commonly called mahogany acids) is actually attached to or dissolved in the acid phase. This is distinctly contrary to the literature and the comomnly accepted belief that the oil soluble sulfonic acids (mahogany) are found in the oil and the oil insoluble acids (green) are found in the sludge. The reason for the contrary facts discovered by me appears to be that when sulfonating a pretreated stock which produces little or none of the ordinary tarry sludge when reacted with concentrated sulfuric acid, the resulting droplets of acid phase from my sulfonation reaction contain sulfuric acid of higher $SO_3$ to $H_2O$ ratio than formerly, and the droplets of acid phase are not loaded with tarry hydrocarbon polymers. This near absence of polymers in the acid phase droplets appears to facilitate the attachment by absorption, adsorption, association and/or true solution of the mahogany acids in the acid droplets to the point where, under my conditions of reaction, the oil phase cannot compete successfully for the socalled oil soluble sulfonic acids. Following this discovery, I have devised a process of separating the unsulfonated oil and refining it into a high quality lubricating oil, while the desired sulfonates are recovered mainly from the acid phase.

It is an object of my invention to provide a process of making mahogany sulfonates without sacrifice in yield and, at the same time, make a byproduct lubricating oil of exceptionally light color and low carbonization number. Another object of my invention is to produce a light colored sulfonate of greater oil solubility and lower viscosity than heretofore produced. Other objects of the invention will become apparent from the following description.

In carrying out my process, I prefer to charge a viscous lubricating oil from a Coloumbia, Venezuela, California, Mid-Continent, Coastal or Arabian crude oil, which has been solvent refined to remove the polynuclear aromatic hydrocarbons and resins. A mild sulfuric acid treatment of the order of 10 to 50 lbs. 90–98% sulfuric acid per bbl. of distillate can be used instead of or in addition to the solvent refining. Refined residual oils can also be used, such as a bright stock which has been de-resined with liquid propane and/or acid or solvent treated. Oils made by alkylation of benzene with long hydrocarbon side chains, such as dinonyl naphthalene and high alkylates produced as by-products in household detergent alkane manufacture, can also be employed in my process. An oil having a viscosity in the range of about 300 to 600 SSU at 100° F. is suitable, although higher viscosity oils may be employed. This oil is sulfonated by intimately mixing with about 10 to 20 vol. percent of oleum containing about 25% $SO_3$, the temperature being controlled to prevent decomposition of the sulfonation products and excessive oxidation of the oil by the $SO_3$ which is a powerful oxidizing agent at higher temperatures, for example above 125° F. In order to obtain complete sulfonation of the aromatic type hydrocarbons present in the oil, it is usually necessary to sulfonate in two or more stages with intermediate cooling. Continuous mixing and sulfonation of the oil and oleum is essential to the success of my process and, in order to obtain smooth, uniform sulfonation with a minimum of oxidative side reactions, I prefer to use a high velocity mechanical mixer providing a high rate of shear, as will be further described hereinafter.

After a short reaction time of not more than 1 to 20 minutes, the sulfonation product is next separated by centrifugal action, employing a centrifugal force upwards of 1,000 times gravity (1000 G.) and usually in the range of 2,000 to 10,000 G. Under the influence of this force, the sludge particles are rapidly thrown from the oil to form an "acid phase" containing a major part of the mahogany sulfonic acids, excess sulfuric acid from the oleum, sulfurous acid ($SO_2$), resins, tars, polymerization products and so-called "green sulfonic acids" undesired in the mahogany sulfonate product. The lighter "oil phase" from the centrifuge consists predominantly of unreacted hydrocarbon lubricating oil substantially free of aromatics, carrying in solution a very small amount of mahogany sulfonic acids together with traces of sulfuric acid and $SO_2$ held in solution largely by the mutual solvent action of the sulfonic acids. In the preferred form of my invention, the oil phase is then neutralized with a monobasic alkali such as sodium hydroxide or ammonia, and extracted with a suitable non-emulsifying solvent to recover the sulfonate, preferably in a multiple stage, countercurrent operation. The solvent is recovered, and the finished oil, usually having a color less than 1 ASTM and carbonization number less than 0.01 ASTM, is ready to be marketed as a high quality lubricating oil.

Where it is desired to use the oil in heavy duty lubricant service, for example, in gasoline and diesel engines, the oil phase can be neutralized directly with lime, barium hydroxide, or other polybasic metal oxide, hydroxide or carbonate, then dehydrated and filtered. The resulting oil needs no purification because of its low sulfate content, a typical sample assaying 0.043% $Na_2SO_4$ equivalent. The sulfonate content, expressed as sodium sulfonate, may be in the range of 2 to 5 percent.

When the sulfonate is extracted from the oil phase, it can be washed with water and an emulsion-breaking solvent, then dehydrated to provide a product of exceptionally light color, usually about 1–2 ASTM at 0.9% ash concentration in oil and low viscosity, adapting it to special uses. However, I usually prefer to combine it with the sulfonate derived from the acid phase, as will be described hereinafter.

In processing the acid phase from the centrifuge, I have discovered that the mahogany sulfonic acids can be selectively extracted with a paraffinic hydrocarbon boiling in the range of 200 to 400° F., herein called a paraffinic naphtha. The undesired color bodies are allowed to remain largely with the acid phase in chemical combination with the strong acid. However, the yield of mahogany acid obtained is low unless inordinately large volumes, e.g., 5–10 volumes, of naphtha are used.

I have discovered that the addition of a small amount of water to the acid phase greatly increases the yield of mahogany acids, but that direct contact with water must be avoided or an excessively dark colored product will result. I have discovered that if the acid phase is first diluted with at least an equal volume of volatile paraffinic naphtha, water can be introduced in an amount of about 3 to 12% of the volume of the acid phase, without excessive hydrolysis of the complex compounds of acid and color bodies and that a selective release of the mahogany acids is obtained. A high speed mechanical mixer providing a high rate of shear is desirable for the mixing operation, the mixer shown in FIGURE 2 being suitable. Naphtha suitable for this purpose should contain less than 2% aromatic hydrocarbons and preferably less than 1% to avoid contamination by sulfonation of aromatics in the naphtha. A suitable diluent is V.M. & P. (varnish makers and painters) naphtha boiling in the range of 250–280° F. and free of aromatic hydrocarbons. A paraffinic extraction naphtha boiling at 290–325° F. which has been treated with concentrated sulfuric acid and redistilled is also suitable.

The naphtha solution of the released sulfonic acids is then separated from the sulfuric acid and sludge and neutralized with an alkali or ammonia. Removal of the paraffinic solvent by distillation leaves the crude sulfonate in concentrated form usually about 50 to 60% in oil. Inasmuch as mahogany sulfonates of this concentration are semi solids and difficult to handle, I prefer to dilute them with a light lubricating oil which may be the by-product oil produced in the process or another lubricating oil distillate, for example, a pale oil, sufficient diluent oil being added to reduce the sulfonate content to about 30 to 40%. The crude sulfonate is then purified with water and emulsion breaking solvent, preferably after combining with the sulfonates extracted from the oil phase. After recovering the emulsion breaking solvent by distillation from the concentrated sulfonate-oil solution, it is dehydrated and filtered hot for the market or it can be converted to poly-valent metal sulfonate while still in solution in the emulsion breaking solvent as described in my U.S. Patent 2,689,221. My process will be more fully understood by the following description thereof in conjunction with the drawing.

Referring to the drawing, hydrocarbon oil from tank 10 is conducted by line 11 through cooler 12 to mixer 13, where it is mixed intimately with a stream of oleum supplied from tank 14 by line 15. The mixer 13 consists of any efficient mixing machine such as the well known "Stratco mixer" or a high speed centrifugal pump which is throttled down or recycled. I prefer to use the gear-type pump such as the Viking or Roper pump in which meshed gears run together and wipe acid against the housing of the pump in intimate contact with the oil, giving a strong churning action. The mixing action of the pump is enhanced by throttling the inlet by means of valves 16 and 17. For example, using a pump with capacity of 50 gallons per minute, I may throttle the feed to the pump to provide a flow rate of only 10 to 20 gallons per minute. The result of this method of operation is that the pump rotor is operating in a partial vacuum, usually about 10 to 20 inches, mercury, and the acid and oil are churned into a fine, intimate suspension providing uniformity of reaction.

Cooler 12 is valuable in warm weather to keep the temperature of the oil feed within the desired range, usually about 50 to 70° F. The amount of oleum mixed with the oil in mixer 13 is controlled to give a temperature rise of about 20 to 30° F., thereby avoiding over-sulfonation.

From mixer 13 the oil-acid mixture passes by line 18 through cooler 19, and thence to mixer 20 where the mixing operation is repeated, additional oleum being introduced through valve 21. A diagram of the rotary gear pump typical of the mixer I have used successfully is shown in FIGURE 2. Using this mixer, it is desirable to introduce the oleum into the oil close to the inlet of the pump and, if desired, the oleum can be introduced through a nozzle, extending directly into the pump chamber, as shown at 22.

Referring again to FIGURE 1, the mixture of oil and oleum is passed by line 23 to pump 24, suitably of the centrifugal type, and thence to the centrifugal machine 25 where it is separated into an oil phase leaving by line 26 and a heavier acid phase leaving the centrifuge by line 27. If desired, additional reaction time can be obtained before separating the phases by recycling the oil through reaction drum 28 and back through manifold 29 to pump 24. Any desired reaction time can be obtained by regulating the level and consequently the hold-up, in drum 28. When operating in this manner, it is desirable to close valve 30 and open valve 31 in transfer line 32.

The oil phase in line 26 carrying a portion of the desired sulfonic acids in solution is next neutralized with caustic alkali from supply tank 33 from which it is drawn by valved line 34, the neutralization taking place in mixer 35, whence the oil flows to horizontal settling drum 36. The caustic solution in tank 33 may suitably be a 20% solution of sodium hydroxide or other base of a monovalent cation. Potassium hydroxide, lithium hydroxide, or ammonium hydroxide can also be used, but sodium hydroxide is preferred because of its low cost and ease of recovery in the subsequent extraction steps.

In order to facilitate the removal of sodium sulfonates from the oil, an emulsion-breaking solvent is introduced by line 42 and by recycle line 37. This solvent is suitably a four-carbon alcohol such as secondary butyl alcohol. Other solvents for this purpose are described in my previously issued U.S. Patents, 2,453,690; 2,689,221; 2,746,987; 2,732,344 and 2,824,126. In settler 36, a brine layer consisting largely of excess alkali, water and solvent, and sodium salts of sulfur acids is withdrawn by line 38. An intermediate layer comprised largely of sulfonic soaps is withdrawn by line 39 while an upper layer of oil is conducted by line 40 to mixer 41 wherein it is thoroughly mixed with additional solvent introduced by line 42 and with water introduced by line 43. The ratio of solvent to water and oil in mixer 41 is controlled to bring about a second separation into three phases, a brine phase discarded by line 44, an intermediate solvent phase containing most of the remaining sulfonates withdrawn by line 45, and an oil phase withdrawn by line 46. The solvent phase containing usually only 1 to 5% of sulfonate in solution is recycled to mixer 35 by line 37, as hereinabove described.

The extracted oil phase containing solvent and some water is next conducted by pump 47 to heater 48, shown here as a pipe heater, and thence to stripping tower 49 where the solvent is flashed off and stripped with steam introduced at 50. Solvent vapors are condensed in cooler 51 and the solvent then passes by lines 52 and 53 to solvent storage tank 54. The oil which may be at a temperature of about 300 to 400° F., flows by line 55 to flash drum 56, preferably of the vacuum type, to remove dissolved water, and the lubricating oil product then passes out of the system by valved line 57 leading to tank 58. If desired, the small amount of sodium sulfonate remaining in the oil—less than 0.1%—can be converted to polyvalent metal sulfonate such as calcium or barium, by contacting with the appropriate salt of such metal as is well known in the art.

RECOVERY OF SULFONATE FROM THE ACID PHASE

The acid phase withdrawn from centrifuge 25 by line 27, which may constitute about 25 to 65% by volume of the mixture of oil and acid charged to the centrifuge, is conducted to mixer 60 where it is thoroughly diluted with about 1 to 3 volumes of a paraffinic hydrocarbon diluent withdrawn from tank 61 by line 62. The mixture then passes by line 63 to a second mixer, 64, where it is intimately contacted with a stream of water introduced by line 65. Instead of water, however, I may use an aqueous sulfuric acid, generally of about 30 to 75% concentration. The purpose of the water or the aqueous acid is to release from the acid phase the desirable sulfonic acids which are held in solution by the highly concentrated sulfuric acid. The action involves hydrolysis of complex compounds formed between the strong sulfuric acid and the sulfonic acids. There are also present in the acid phase, complex compounds of resinous and highly colored polymerization products in combination with strong acid, and it is very desirable that these compounds be allowed to remain in the acid phase undisturbed and unhydrolyzed in order to avoid contamination of the sulfonate product with these color bodies. I have discovered that if the water or diluted sulfuric acid introduced by line 65 is intimately and rapidly mixed with the diluted acid phase from mixer 60, hydrolysis of the color complexes can be greatly diminished. To achieve selective hydrolysis of sulfonic acids and their release from the acid phase without, at the same time releasing undesired color bodies, I have found it necessary to first mix the acid phase with at least an equal volume of the hydrocarbon diluent. To obtain rapid and intimate contact between the water or dilute sulfuric acid and the acid phase, I prefer to use a mixer of the type shown in FIGURE 2, the water, in this case, being introduced by nozzle 22. The amount of water needed to release the sulfonic acids is about 1 to 4% of the oil charged to the system by line 11, equivalent to about 3 to 12% of the acid phase in line 27. Less water can be used with higher naphtha dilutions. When using diluted sulfuric acid for this purpose instead of water, it is necessary to increase the amount of dilution still further.

From mixer 64, the acid phase and diluent hydrocarbon solution pass by line 66 to settler 67 where a sludge layer is withdrawn by line 68. The diluent solution is then neutralized in mixer 69 by the action of a caustic solution from line 70. Some lubricating oil may also be introduced as a carrier for the sulfonates, line 71 being used for this purpose. This oil may be the product from line 57 or another suitable distillate lubricating oil such as 150 neutral oil, pale oil of 60 to 200 SSU viscosity at 100° F., and the like.

From mixer 69, an alkali brine containing excess caustic and salts of sulfur acids is settled in settler 72 and withdrawn by line 73. The hydrocarbon diluent solution of sulfonate is conducted by line 74 to pipe heater 75 and thence to stripper 76 where the hydrocarbon diluent is driven overhead and condensed in cooler 77, whence it flows by line 78 back to diluent tank 61. Stripped soaps from 76 flow by line 79 through cooler 80 into mixer 81 where they are thoroughly mixed with solvent introduced by line 82 and water, if necessary, by line 83. Sodium chloride brine from tank 84 may also be needed to assist in the purification of the sulfonic soaps. The mixture then passes to settler 85 where brine is removed by line 86, and the purified sulfonate-oil stream passes by line 87 to pipe heater 88 and flash drum 89 to remove water and solvent vapors which are condensed in cooler 90, recovered solvent flowing by line 91 and pump 92 back to mixer 81 or, if in excess of that needed there, by line 53 to solvent storage 54. The stripped oil-soap product now passes by line 93 to vacuum stripper 94 where the remaining dissolved water is removed at a temperature of about 300° F., the dehydrated soap being withdrawn from the system by pump 95 and line 96 leading to tank 97.

Sulfonic soaps extracted from the oil phase in settler 36 and withdrawn by line 39 can be separately purified and dehydrated by a suitable solvent treatment, as indicated hereinabove, but I prefer to introduce them into mixer 81 where they are combined with the soaps from the acid phase and purified simultaneously. I have found that the combined sulfonates from the two phases separated in centrifuge 25 are somewhat different in respect to oil solubility and emulsion forming characteristics, and that, when combined, the purification operation is greatly facilitated.

The data presented in the following examples further illustrate the invention. They were obtained in the sulfonation of a "480 neutral" oil with oleum containing 26% SO$_3$. The oil was a solvent refined lubricating distillate having a viscosity index of 90 and viscosity of 500 SSU at 100° F. The sulfuric acid absorption test (ASTM D–484–52) showed 87% acid insoluble. In sulfonating this oil, the oleum was applied thru the mixer shown in FIG. 2, employing two mixers in series with intervening cooling to 80° F. A rise in temperature of 30° F. occurred in the first stage starting with a stock temperature of 64° F., with a rise of 20° F. in the second stage, the oleum requirement being 9.5% by volume for the complete treatment.

The mixing pumps in both stages had a capacity of 90 gallons per minute operating at a rotational speed of 260 r.p.m. and the oil feed was throttled down to a flow rate of 30 gal. per min. providing a vacuum in the mixer of 20–24 inches mercury.

From the second contactor, the reaction mixture was passed thru a cooler requiring less than ten minutes for cooling, usually about six minutes or less, then to the centrifugal separator. I may pass the reaction product directly from the contactor to the centrifuge without cooling or further mixing, thereby reducing the time interval between mixer and centrifuge to only about 10 to 60 seconds. Centrifugal separation of sludge was effected in a De Laval machine with the centrifuge bowl—4.5 in. diam.—rotating at 12,700 r.p.m. producing a centrifugal force of approximately 9,000 times gravity. The following example shows the effect of feed rate on sludge separation at ambient temperature, 80° F.:

*Example 1*

| Feed Rate, gals./hr. | Residence, Time, Mins. | Oil Phase, Percent | Acid Phase Percent |
|---|---|---|---|
| 0.703 | 9.2 | 64.6 | 35.4 |
| 1.49 | 4.5 | 64.3 | 35.7 |
| 2.77 | 3.0 | 64.0 | 36.0 |
| 3.01 | 2.24 | 55.0 | 45.0 |
| 3.7 | 2.0 | 51.1 | 48.9 |
| 9.0 | 0.75 | 15.1 | 84.9 |

These data show that a residence time of 3 minutes or more is required to effect complete separation of acid phase under these conditions.

One hundred parts by weight of the oil phase from run 2 above was mixed with an equal volume of aqueous secondary butyl alcohol and neutralized with an excess of 20% NaOH soln. The mixture was settled 2 hrs., an aqueous brine layer was removed and the oil was dehydrated to 350° F. and filtered. Yield 91.5%. Analysis follows:

Ash ---- 0.93% (as CaSO$_4$).
Sodium sulfonate ---- 6.52%.
Color, ASTM ---- Less than 1.
Alkali value ---- 0.3.
Sulfate as Na$_2$SO$_4$ ---- .043%.

Titration of the acid phase from run 2 showed an acid value of 451. Extraction with 250% by wt. of paraffinic solvent (VM&P) in three stages, 100, 100 and 50, gave a combined extract having an acid value of 59, the 3rd extract having an acid value of only 3.9, showing nearly complete recovery of sulfonic acid from the acid phase without addition of water to release the sulfonic acids.

The combined extract was neutralized with an excess of sodium hydroxide solution, brine was settled and discarded. The solvent was distilled off and the sulfonate was dehydrated to yield 63 parts by weight of crude sulfonate. This was purified by mixing with 62.5 parts of aqueous sec. butanol and 62.5 gm. sodium chloride brine 2.5%. Brine was settled out and the purified sulfonate was dehydrated to 350° F. The yield was 62.5% based on the weight of the acid phase.

Analysis:
    Ash, as NaSO$_4$ ---- 7.54.
    Alkali value ---- 0.1.
    Sulfate, as Na$_2$SO$_4$ ---- 0.58%.
    Sulfonate (calc.) ---- 53.3%.
    Color, ASTM ---- 4.5–5 (diluted).

*Example 2*

In this experiment, the lubricating oil stock described above was sulfonated in two stages with intermediate cooling, contact between oleum and oil being effected in the rotary contactor as described previously. The temperature rise in the successive contactors was 30° F. and 20° F. respectively. The rate of contacting was 2.86 gal. per min. with 9.56% by volume of oleum (26% SO$_3$). The sulfonation mixture was centrifuged immediately into two layers as in Example 1.

The oil phase was 62% by wt. while the acid phase was 38% of the sulfonated mixture. The acid phase was mixed with an equal volume of paraffinic naphtha free of aromatics, then divided into two equal parts which were treated as follows:

| Part 1 | Part 2 |
| --- | --- |
| 2% water mixed in. | 4% water mixed in. |
| Settled 15 min.—A.V.—26.2. | Settled 15 min.—A.V.—24.1. |
| Settled 30 min.—A.V.—25.1 | Settled 30 min.—A.V.—21.5. |
| Settled 60 min.—A.V.—23.5. | Settled 60 min.—A.V.—20.5. |
| Sludge layer,[1] 23.2%, AV—857. | Sludge layer,[1] 26.5%, AV—795. |
| Sludge layer discarded. | Sludge layer discarded. |
| Oil layer neutralized—NaOH. | Oil layer neutralized—NaOH. |
| Brine settled out—discarded. | Brine settled out—discarded. |
| Solvent stript with steam. | Solvent stript with steam. |
| Yield—Crude soap [1]—42.8%. | Yield—Crude soap [1]—43.3%. |
| Purified—aqueous sec. butanol. | Purified—aqueous sec. butanol. |
| Dehydrated to 350° F. | Dehydrated to 350° F. |
| Yield 38.7%. | Yield 39.3%. |
| Analysis: | Analysis: |
|   Ash—8.65%. |   Ash—8.83%. |
|   Alkali value 2.8. |   Alkali value 3.4. |
|   Sulfate 0.332%. |   Sulfate 0.275. |
|   Yield [1] 18.15%. |   Yield [1] 18.82. |

[1] Percent by weight based on the weight of the acid phase.

100 parts of the oil phase were neutralized with NaOH, washed and extracted with aqueous sec. butanol, then dehydrated to yield 8.5% of sodium sulfonate having an ash value of 10.42%. The extracted lubricating oil was nearly free of sulfonate as shown by the low ash value of .013%. The yield of oil was 89.8% of the oil phase by weight and the color was pale yellow, less than 1 ASTM.

*Example 3*

Another sulfonation was made as above described and the mixture was separated on the centrifuge immediately, collecting 6 gallons of oil phase and 2.3 gallons of acid phase. The oil phase was neutralized with excess NaOH solution at 160° F. and extracted with ½ volume of aqueous secondary butanol (28% $H_2O$). Brine and sulfonate layers were removed. It was again washed with a mixture of 10% by volume of aqueous secondary butanol and 20% of water at 160° F. The alcohol layer was withdrawn and the oil was dehydrated to 350° F. Yield 87.5%. Analysis of the oil follows:

| | |
| --- | --- |
| Ash | .009%. |
| Alkali value | Neutral to phenolphthalein. |
| Sulfate as $Na_2SO_4$ | .002%. |
| Carbon residue, ASTM | 0.00. |
| Color, ASTM | Below 1. |
| Flash | 480° F. |
| Gravity, API | 30.0. |
| Viscosity, SSU/210° F | 58.53. |
| Viscosity index | 96.28. |

The sulfonate extract from the above oil was dehydrated to 350° F. Yield, 1218 grams. For convenience in handling, viscosity was reduced by adding 200 gm. oil, the resulting mixture testing as follows:

| | | |
| --- | --- | --- |
| Ash | Percent | 8.89 |
| Sulfonate | do | 56.8 |
| Alkali value | | 3.9 |
| Sulfate | Percent | 0.16 |
| Viscosity at 210° F. SSU | | 22.0 |

This viscosity is low for a sulfonate-oil solution having a sulfonate content of 56.8% (calculated from the neutral ash value and molecular weight of the calcium sulfonate, 480).

The acid phase from above was diluted with 3 volumes of non-aromatic naphtha and two samples were treated as follows:

| Sample | I | II |
| --- | --- | --- |
| Volumn, cc | 300 | 300 |
| Weight, gms | 265 | 265 |
| Solvent naphtha added, cc | 900 | 900 |
| Water added, gms | 18 | |
| $H_2SO_4$—75%, added, gms | | 60 |
| Mixed and settled 30 mins | | |
| Acid value of oil layer | 20.2 | 28.0 |
| Settled 1 hour, acid value | 18.6 | 25.6 |
| Settled overnight, acid value | 17.8 | 23.2 |
| Thin sludge ($H_2SO_4$), cc | 66 | 108 |
| Thick sludge, cc | 15 | 10 |
| NaOH—20%, added, cc | 55 | 71 |
| Alkali value of wet sulfonate | 3.4 | 3.8 |
| Dehydrated at 350° F. Yield, gm | 157 | 152 |
| Ash | 7.59 | 7.65 |
| Alkali value | 0.5 | 0.1 |
| Sulfate, as $Na_2SO_4$ | 0.391 | 0.440 |

This experiment shows that the addition of 60 grams of 75% sulfuric acid has about the same effect in driving the sulfonic acids into the naphtha solution as does 18 grams of water.

EXAMPLE 4

This example shows the effect of incomplete separation of acid from the oil phase. Solvent refined 480 neutral stock was sulfonated as above and separated by centrifuging for two different residence times with the following results:

| Test | Volumn of Oil phase, Percent | Acid Value | Neutral, Ash Percent | Gravity, API |
| --- | --- | --- | --- | --- |
| 1 | 65 | 22.3 | 0.843 | 27.5 |
| 2 | 70 | 28.5 | 0.985 | 27.0 |

It will be noted that the increased yield of oil phase in test 2 is the result of inclusion of a larger amount of the acid phase therein, as shown by the higher acid value and lower API gravity, as well as the increased ash after neutralization with sodium hydroxide.

As an indication of the suitability of a lubricating oil stock for my process, I can use the sulfuric acid absorption test, ASTM D–484–52, referred to hereinabove. By this test, a sample of the oil is extracted with 95% sulfuric acid and the volume of the unabsorbed oil is measured. Oils with an acid absorption number of between 80 and 100 are suitable, preferably between 85 and 100. A very good oil from California crude which I have used extensively has an acid absorption number of 94.

The severity of the sulfonation treatment employed in my process will vary with the character of the oil treated, particularly its aromatic content. Most oils require about 10 to 15 percent by weight of oleum of 25% $SO_3$ content. Based on $SO_3$, this is equal to 2.5 to 3.7%. Oils high in aromatics, such as synthetic alkyl benzenes, may require up to 10% $SO_3$ whereas some petroleum stocks can be fully sulfonated with only 2% $SO_3$ used in the form of oleum of 10 to 65% $SO_3$ content. In this specification and claims, the term "oleum" is used to mean an acid of this strength. Also, where it is specified the sulfonation mixture be separated "immediately" by centrifugal action, a reasonable time for transferring the oil must be allowed, usually from 1 to 10 minutes, not more than 1 hour.

Having thus described my invention, what I claim is:

1. The process of making mahogany sulfonates which comprises contacting a hydrocarbon lubricating oil having an acid absorption value between 80 and 100 with oleum of 10 to 65% $SO_3$ content, to produce a mixture of mahogany sulfonic acids, green sulfonic acids, sulfuric and sulfurous acids and tars, then immediately, without diluting the said reaction mixture, separating it into an oil phase and an acid phase by centrifugal force before decomposition of said sulfonic acids and tars occurs to contaminate the mixture with oil soluble color bodies, diluting said acid phase with from 1 to 3 volumes of a paraffinic naphtha solvent, thereby forming a solution of sulfonic acids in said naphtha solvent, separating an acid sludge, neutralizing the sulfonic acids in both said naphtha solution and said oil phase by contacting with a base of a monovalent cation and recovering the resulting mahogany sulfonates therefrom.

2. The process of claim 1 wherein the mahogany sulfonate from the oil phase consisting predominately of oil is combined with the mahogany sulfonate obtained from the acid phase and the mixture of oil and sulfonates is purified of contaminating salts of sulfur acids and green sulfonic acids by extraction with water and an emulsion breaking solvent.

3. The process of claim 1 wherein the transfer of mahogany sulfonic acids from said acid phase to said naphtha solvent is facilitated by introducing into the diluted acid phase from 3 to 12 percent of water based on the volume of said phase, and intimately mixing it therewith after said dilution step and before separating said acid sludge.

4. The process of claim 1 wherein the transfer of mahogany sulfonic acids from said acid phase to said naphtha solvent is facilitated by introducing into the diluted acid phase, a solution of sulfuric acid and water in a concentration of about 30–75%, and intimately mixing it with said diluted acid phase after said dilution step and before separating said sludge, the amount of sulfuric acid added being sufficient to reduce the acidity of said sludge to less than 900 mg. KOH per gm. equivalent when titrated with phenolphthalein indicator.

5. The process of claim 1 wherein the centrifugal force employed is at least 1000 times gravity.

6. The process of claim 1 wherein the separation of said oil phase and said acid phase is completed within about one to ten minutes.

7. The process of making petroleum mahogany sulfonates comprising intimately mixing a lubrication oil having an acid absorption value between 80 and 100 and a sulfonating agent comprising oleum of 10 to 65% $SO_3$ content, controlling the ratio of said agent to said oil to prevent a rise in temperature above about 125° F., immediately separating the reaction mixture into an oil phase and an acid phase by centrifugal force, neutralizing sulfonic acids in said oil phase by contacting with a monobasic alkali, thereby forming water soluble sulfonates, extracting said sulfonates from said oil phase; diluting said acid phase with at least an equal volume of a volatile paraffinic hydrocarbon diluent, intimately mixing the resulting dilution with about 3 to 12% of water based on the volume of said acid phase, thereby forming a solution of sulfonic acids in said paraffinic hydrocarbon diluent and an acid sludge, separating said sludge, neutralizing said sulfonic acids with an alkali thereby forming a neutral sulfonate in solution in said hydrocarbon diluent, evaporating said diluent and subjecting the neutral sulfonate to the action of water and an emulsion preventing solvent to remove therefrom undesirable salts of sulfur acids and green acid sulfonates.

8. The process of claim 7 wherein the amount of oleum employed is sufficient to provide said sulfonation step with 2 to 10% $SO_3$, based on the weight of oil treated.

9. The process of making mahogany sulfonates by sulfonation of lubricating oil which comprises contacting a partially refined hydrocarbon oil of about 350 to 800 molecular weight from which polynuclear aromatics and unsaturates have been removed, said oil having an acid absorption value between 80 and 100 comprising contacting said oil with oleum of 10 to 65% $SO_3$ content, employing sufficient oleum to produce a mixture of sulfonic acids, unsulfonated oil and spent sulfuric acid in which the spent acid has a concentration of about 90 to 100% $H_2SO_4$ oil-free basis as a result of which a major proportion of the desired mahogany acids are retained in the acid as an oil-insoluble complex, difficult to separate from said unsulfonated oil, subjecting the mixture to the action of centrifugal force greater than 1,000 times gravity, thereby separating said unsulfonated oil having a minor amount of mahogany sulfonic acids from said spent acid by extraction with about 1–3 volumes of a hydrocarbon solvent, neutralizing the mahogany acid-solvent extract and distilling the solvent from the resulting mahogany sulfonate.

References Cited in the file of this patent

UNITED STATES PATENTS

| | | |
|---|---|---|
| 2,406,763 | Griesinger | Sept. 3, 1946 |
| 2,479,202 | Bransky et al. | Aug. 16, 1949 |
| 2,732,344 | Bray | Jan. 24, 1956 |

OTHER REFERENCES

Brown: "Institute of Petroleum Review," vol. 9, pages 314–321, 1955.